United States Patent [19]

Nagata et al.

[11] Patent Number: 5,606,456
[45] Date of Patent: Feb. 25, 1997

[54] IMAGE PROCESSING APPARATUS AND DISPLAY SYSTEM

[75] Inventors: Toru Nagata, Yokohama; Hiromi Someya, Kawasaki, both of Japan

[73] Assignee: Canon Kabushiki Kaisha, Tokyo, Japan

[21] Appl. No.: 197,454

[22] Filed: Feb. 16, 1994

Related U.S. Application Data

[63] Continuation of Ser. No. 72,859, Jun. 7, 1993, abandoned, which is a continuation of Ser. No. 924,590, Aug. 10, 1992, abandoned, which is a continuation of Ser. No. 627,924, Dec. 17, 1990, abandoned, which is a continuation of Ser. No. 402,993, Sep. 6, 1989, abandoned, which is a continuation of Ser. No. 306,226, Feb. 3, 1989, abandoned, which is a continuation of Ser. No. 896,639, Aug. 15, 1986, abandoned.

[30] Foreign Application Priority Data

Aug. 23, 1985 [JP] Japan ................................. 60-185167
Aug. 26, 1985 [JP] Japan ................................. 60-187089
Aug. 26, 1985 [JP] Japan ................................. 60-187090
Aug. 28, 1985 [JP] Japan ................................. 60-187091

[51] Int. Cl.$^6$ ........................................................ G02B 27/64
[52] U.S. Cl. ........................ 359/554; 359/557; 359/683; 359/691; 359/813; 348/208
[58] Field of Search .................................... 350/247, 500, 350/252, 255; 73/505, 510, 511; 354/402–407, 226–227.1; 359/554–557, 813–814, 819, 822–824, 676, 677, 683–685, 691–692, 694, 696–697

[56] References Cited

U.S. PATENT DOCUMENTS

| | | | |
|---|---|---|---|
| 3,577,205 | 5/1971 | Hobrough | 359/557 |
| 3,608,995 | 9/1971 | Humphrey | 359/557 |
| 3,608,997 | 9/1971 | Humphrey | 359/557 |
| 3,638,502 | 1/1972 | Leavitt et al. | 348/208 |
| 3,651,325 | 3/1972 | Alpers | 359/557 |
| 3,941,451 | 3/1976 | Humphrey | 359/554 |
| 3,942,862 | 3/1976 | Furukawa et al. | 359/554 |
| 3,944,324 | 3/1976 | Tajima et al. | 359/554 |
| 4,013,339 | 3/1977 | Ando et al. | 359/554 |
| 4,235,506 | 11/1980 | Saito et al. | 359/556 |
| 4,290,684 | 9/1981 | Hines | 354/70 |
| 4,370,038 | 1/1983 | Kimura | 250/201.2 |
| 4,491,397 | 1/1985 | Barthelat et al. | 359/554 |
| 4,500,189 | 2/1985 | Aoki | 354/407 |
| 4,562,346 | 12/1985 | Hayashi et al. | 354/406 |
| 4,623,930 | 11/1986 | Oshima et al. | 358/222 |
| 4,633,072 | 12/1986 | Sugiura et al. | 250/201.2 |
| 4,705,380 | 11/1987 | Yamamoto et al. | 354/402 |
| 4,713,697 | 12/1987 | Gotou et al. | 358/222 |
| 4,788,596 | 11/1988 | Kawakami et al. | 348/208 |
| 4,996,545 | 2/1991 | Enomoto et al. | 359/554 |
| 4,998,809 | 3/1991 | Tsujii et al. | 359/554 |

FOREIGN PATENT DOCUMENTS

| | | | |
|---|---|---|---|
| 0115126 | 5/1988 | Japan | 359/554 |
| 1056527 | 1/1967 | United Kingdom. | |
| 1148951 | 4/1969 | United Kingdom. | |

*Primary Examiner*—James Phan
*Attorney, Agent, or Firm*—Fitzpatrick, Cella, Harper & Scinto

[57] ABSTRACT

A device for compensating movement of an image formed by an optical system comprises first and second sensing units arranged at different positions along an optical axis of the optical system to sense an acceleration of the device, a compensation optical system arranged on a light path of the optical system and supported movably relative to the device to compensate for the movement of the image driver for driving the compensation optical system, and a calculation unit for calculating a displacement of the compensation optical system based on the outputs of the first and second acceleration sensing units and supplying displacement information to the driver.

13 Claims, 3 Drawing Sheets

IMAGE PROCESSING APPARATUS AND DISPLAY SYSTEM

This application is a continuation of prior application Ser. No. 08/072,859 filed on Jun. 7, 1993, which is a continuation of application Ser. No. 07/924,590 filed Aug. 10, 1992, which is a continuation of application Ser. No. 07/627,924 filed on Dec. 17, 1990, which is a continuation of application Ser. No. 07/402,993 filed on Sep. 6, 1989, which is a continuation of application Ser. No. 07/306,226 filed on Feb. 3, 1989, which is a continuation of application Ser. No. 07/896,639 filed on Aug. 15, 1986, all six applications now abandoned.

BACKGROUND OF THE INVENTION

1. Field of the Invention

The present invention relates to an optical antivibration system.

2. Related Background Art

A demand for an optical antivibration system is very high. Vibration of an image screen is usually caused by mounting a camera on an automobile or moving the camera while it is carried by hands during photographing of sports scene or news scene. In most cases, the sports program and news program are photographed by a video camera or cinecamera. In a still camera, the vibration of the image is caused when a camera having a long focal distance lens mounted thereon is hand-carried. A tripod is usually used but the operability is degraded.

In one known optical anti-vibration system, an optical wedge is provided in an imaging system to correct an offset of a light path due to a signal by a prism function by changing an angle of the optical wedge. In another system, a reflection mirror fixed by a gyroscope device relative to a spatial coordinate is arranged in an imaging system and an image is stabilized by utilizing a deflection of a light path by the reflection mirror. However, both systems are large in size and not suitable for long-time hand-carried photographing.

In another method, an auxiliary lens is suspended so that an optical axis of the auxiliary lens is movable in a direction parallel with an optical axis of this photo-taking system, for example, by liquid, and the auxiliary lens is maintained in a position relative to a spatial coordinate by the viscosity of the liquid even if an external force is applied to the system.

Such systems may be used not only in the camera but also in conventional binoculars and instrumental binoculars.

SUMMARY OF THE INVENTION

It is an object of the present invention to compensate for movement of an object image when an unexpected external force is applied to an apparatus.

It is another object of the present invention to effectively compensate for movement of an object image.

DETAILED DESCRIPTION OF THE PREFERRED EMBODIMENTS

Figure 1:
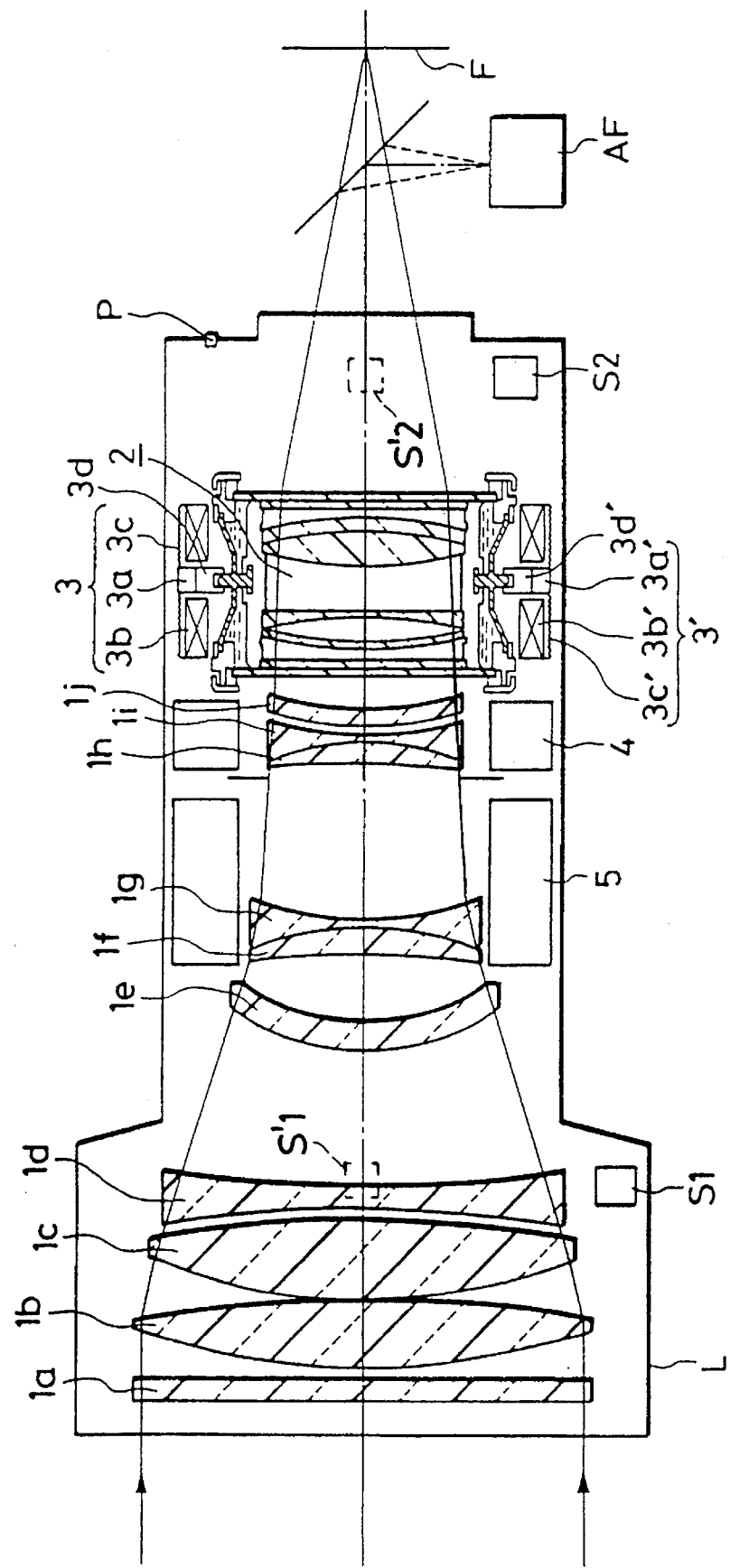
FIG. 1 is an optical sectional view of an embodiment of the present invention.

A displacement of an optical axis of a focusing optical system due to vibration of a camera causes movement of an image and degrades an image quality. In order to prevent or reduce it, it is necessary to detect the displacement of the optical axis. It should be noted that influences of the displacement of the optical axis to the movement of the image include an influence by a rotation around a principal point and an influence by parallel movement of the principal point, when a distance to an object is within 30 times of a focal distance, and that an imaging magnification affects those at different rates. An image vibration $\Delta$ by the rotation around the principal point and an image vibration $\Delta'$ by the parallel movement of the principal point are expressed by $$\Delta = f(1-\beta) \cdot \theta$$

$$\Delta' = t\beta$$

when f is a focal distance of the imaging lens, $\beta$ is a lateral magnification, $\theta$ is a rotation angle of the optical axis and t is a parallel movement distance of the principal point.

In accordance with the present invention, accelerations which cause different types of image vibrations are detected and an acceleration for a correct image vibration is determined to compensate therefore.

An acceleration sensor, particularly a servo type acceleration sensor which detects the vibration of the camera is particularly suitable from standpoints of size, response and cost. In order to obtain a displacement signal from the output image of the acceleration sensor of this type, an integration should be made twice. The camera must be stationary at the time of start of integration.

In order to drive the correction optical system for compensating the camera vibration by the displacement signal obtained in this manner, it is necessary to increase a correctable stroke of the correction optical system. The correction may not be made if the stroke has been exhausted during the open state of the shutter.

The inventors of the present invention noticed that:

(A) The velocity-displacement integration in the two time integrations operation, need be done only during a time period in which the vibration compensation is required, and (B) In the still camera, the vibration compensation is required only during focusing operation and the open status of the shutter. The embodiment of the present invention resolves the above problems, To achieve this, in accordance with the embodiment of the present invention, signal generation means for generating a velocity signal relating to a velocity of camera vibration, integration means for integrating the velocity signal and control means for controlling the integration of the integration means are provided, and the control means permits the operation of the integration means in accordance with a camera operation sequence signal.

On the other hand, an image on an image plane can be moved by providing an area in an optical system which is displaceable perpendicular to an optical axis and displacing that area. Accordingly, an imaging lens which is free from camera vibration can be attained by defining the displacement to cancel the movement of the image caused by the camera vibration.

Requirements for a suspension mechanism are:

(1) No inclination of the optical axis during the displacement.

(2) No friction or loss to a drive force (3) The lens displaced is movable two-dimensionally.

In order to meet the above requirements, the displaceable portion and other portion of the optical system may be constructed in parallel and the displaceable portion may be driven, but the spacing between the parallel planes and the parallelism thereof must be precisely maintained in order to assure the optical characteristic. However, it is not advisable from the standpoints of friction and adoptability to the two-dimensional motion to adjust the spacing by a mounting member or mechanically supporting the optical system externally of a suspension barrel.

A suspension mechanism to be described later resolves the above problems. It has been noticed that by constructing the displaceable portion to be parallel to a front portion and a rear portion, both spacings are of a symmetric structure, and it is when the vibration is compensated for that strict spacing is required, and this is when the displaceable portion is moving.

A portion of the optical system is suspended by liquid, and the suspended portion and other portion are constructed to form parallel planes. A portion whose spacing to the opposing plane is variable along the optical axis is provided on the parallel plane or a member which holds the parallel plane. Dynamic pressure effect of the liquid caused by an offset between the plane having the variable portion and the opposing plane is symmetrically created before and after the suspended portion so that the parallelism and the spacing are maintained.

A seal structure of an operation element, whether it moves linearly or rotates, accompanies with a substantial friction, and a seal member of a lens drive unit and a linkage member of the lens accompanies with a large friction. This may cancel the advantage of the liquid suspension. In the embodiment of present invention, a loss by the friction is eliminated. The present invention is also applicable to a system other than a convergence system arranged behind an afocal optical system.

In order to resolve the above problem, a displaceable optical element of an anti-vibration device is arranged in a correction bodytube of an air tight structure having a substantially planar incident/outlet plane. The correction bodytube is dipped in the liquid in a suspension tube having a substantially planar light transmission plane opposing to the incident/outlet plane, and a flexible wall is provided to the suspension tube so that the correction bodytube is driven without damaging the air tightness of the suspension tube.

The present invention is now explained in detail with reference to the drawings.

FIG. 1 is a sectional view showing an arrangement of major elements in a bodytube L. Numerals $1a$ to $1j$ denote lenses of an afocal optical system of a telescopic lens. Composite lenses $1f$ and $1g$ are focus lenses which are advanced or returned for focusing. Numeral 2 denotes a correction optical unit including a correction optical system which focuses a parallel light beam and moves, i.e., shifts an image by a shift which is normal to an optical axis. The correction optical system is housed in the bodytube in an air tight arrangement. A ratio of the shift of the correction optical unit and a shift of an image on an image plane is unity. Numerals 3 and 3' denote plungers which are coupled to the correction optical unit 2 through spacers $3d$ and $3d'$ and comprise movable magnets $3a$ and $3'a$, coils $3b$ and $3'b$ and leaf springs $3c$ and $3'c$ which maintain the movable magnets $3a$ and $3'a$ in position when they are deenergized. S1 denotes an acceleration sensor arranged near a principal point of the lens for detecting an acceleration which is normal to the optical axis and parallel to a plane of the drawing, and S2 denotes an acceleration sensor arranged near the image plane for detecting an acceleration of the same direction as which S1 detects. A second set of plungers and acceleration sensors S'1 and S'2 are also arranged in a plane containing the optical axis and normal to a plane of the drawing in FIG. 1. These sensors detect movement in a direction orthogonal to the direction of movement detected by sensors S1 and S2. Numeral 4 denotes a diaphragm drive control unit and numeral 5 denotes a focus drive control unit for driving the focus lenses $1f$ and $1g$ along the optical axis. P denotes one of contacts through which focus information, diaphragm information and release information are communicated with a camera body (not shown), and F denotes the image plane determined by a silver halide film or a solid-state imaging device. A hold/drive mechanism of the correction optical unit 2 will be explained in connection with FIG. 3.

Figure 2:
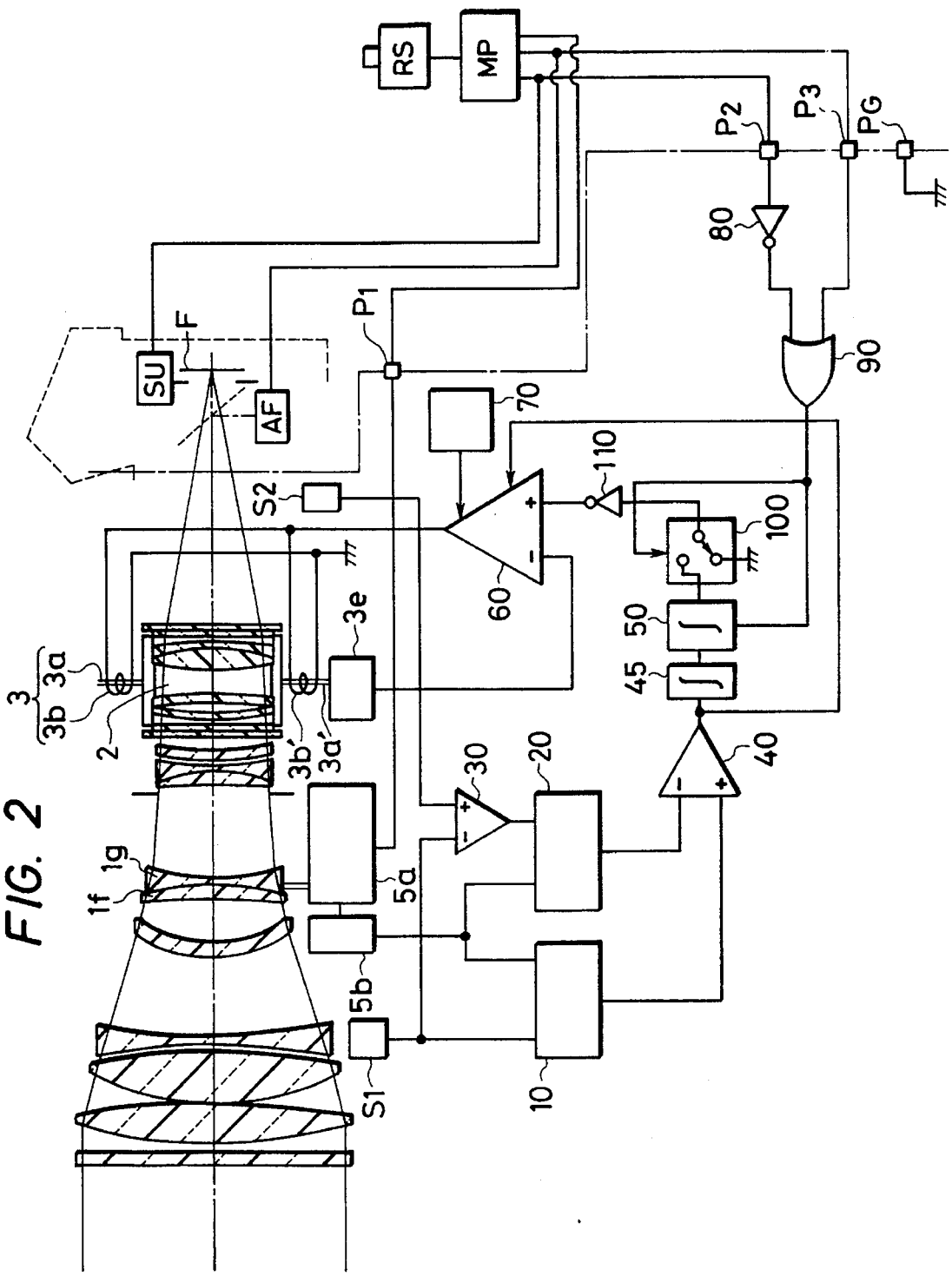
FIG. 2 is a block diagram of a vibration compensation system.

FIG. 2 shows a block diagram of an entire system of the present embodiment. Numeral $5a$ denotes a focus driver for driving the focus lenses $1f$ and $1g$ in accordance with a known focus control signal of the camera applied to a contact P1, numeral $5b$ denotes a focus position detector for detecting an axial position of the focal lens, numeral 10 denotes an acceleration calculation circuit for the image due to a shift of an imaging optical axis. It calculates a lateral magnification $\beta$ determined based on an output signal of a focus position signal detector $5b$ and multiplies it with an output of the acceleration sensor S1. Numeral 20 denotes an acceleration calculation circuit of an image due to a rotation of the optical axis around the principal point. It imparts a weight determined by the focus position signal to a difference between the acceleration sensor S2 and the acceleration sensor S1 produced by a division circuit 30. Those signals are added by an adder 40 to produce an acceleration of the image. The acceleration is calculated in the following manner.

(10) The lateral magnification $\beta=-x/f$ and the acceleration due to the shift of the optical axis $a10=-(x/f)\cdot a1$, where $a1$ is the output of the acceleration sensor S1, $x$ is the output (driven distance) of the focus position detector $5b$, and $a10$ is the output at the focal distance $f$ in the overall imaging lens.

(20) The tilt of the optical axis $\theta=(-a1+a2)/l$, and the acceleration of the image due to the rotation around the principal point $a20=(x+f)\cdot(-a1+a2)/l$, where $a1$ is the output of the acceleration sensor S1, $a2$ is the output of the acceleration sensor S2, $l$ is a distance between the acceleration sensors S1 and S2, $x$ is the driven distance and $f$ is the focal distance.

Numeral 45 denotes an integration circuit which produces a velocity signal based on the acceleration signal during the operation of the system, and numeral 50 denotes an integration circuit which integrates with time from a time of application of a voltage to a reset input to produce a displacement of the image at a time elapsed from the reset time.

A start of integration signal is supplied by an OR gate 90. A shutter open signal (HIGH→LOW) supplied from a microprocessor MP of the camera to a contact P2 or a start of integration signal (LOW→HIGH) of an auto-focusing focus detection unit AF supplied to a contact P3 depending on a degree of depression of a release switch RS is supplied to the OR gate 90. The start of integration signal is kept while the signal is stored into the sensor of the detection unit AF. The start of integration circuit is also supplied to a switching circuit 100, and the image displacement signal is applied to a driver 60 of the actuator 3 through an inverter 110 during the open status of the shutter or storing period of the sensor of the focus detection unit AF, PG denotes a ground terminal (GNO) of the lens and the camera.

The actuator driver 60 compares the output of the position detector 3e of the correction optical unit 2 with the output of the inverter 110 and energizes the coils 3b and 3b' of the actuator to make the difference zero. As a result, the correction optical unit 2 is driven oppositely to the displacement signal, i.e., is decentered by coils 3b and 3b', and the movement of the image on the image plane F is stopped because the ratio of the shift of the correction optical unit to the shift of the image on the image plane F is unity as described above. The image acceleration signal is fed forward to the driver 60, which carries out a prediction control and drives the actuator by referencing a characteristic input circuit 70 of the actuator.

The operation of the system will now be described in accordance with the operation sequence of the camera.

While the camera is stationary, the operation of the system is started, and the release button RS is depressed to a first stroke so that the auto-focus sequence is started. During the storing in the sensor of the focus detection unit AF, the correction optical unit 2 is activated to prevent vibration of the image. When the release button is depressed to a second stroke and the shutter is released, the shutter is opened and the vibration of the image is again prevented during that period.

With the arrangement described above, the displacement of the correction optical unit can be substantially limited and a given movement of the compensation optical unit can conform to a large amplitude of camera vibration. This will be illustrated below.

The image vibration Y is represented by $Y = A \sin 2\pi ft$, where A is an amplitude of the image vibration and f is a frequency of the image vibration. Accordingly, $$\dot{Y} = 2\pi f A \cdot \cos 2\pi ft$$

The stroke $\alpha$ required for the correction optical unit is given by $$\alpha = \int_{-T/2}^{+T/2} \dot{y} \, dt = 2A \cdot \sin \pi ft$$

where T is the shutter open time.

For example, when f=1 Hz and T=25×10$^{-3}$ sec, then $\alpha$=0.16 A. The above result indicates that the anti-vibration device can suitably deal with the vibration having a large amplitude.

Figure 3:
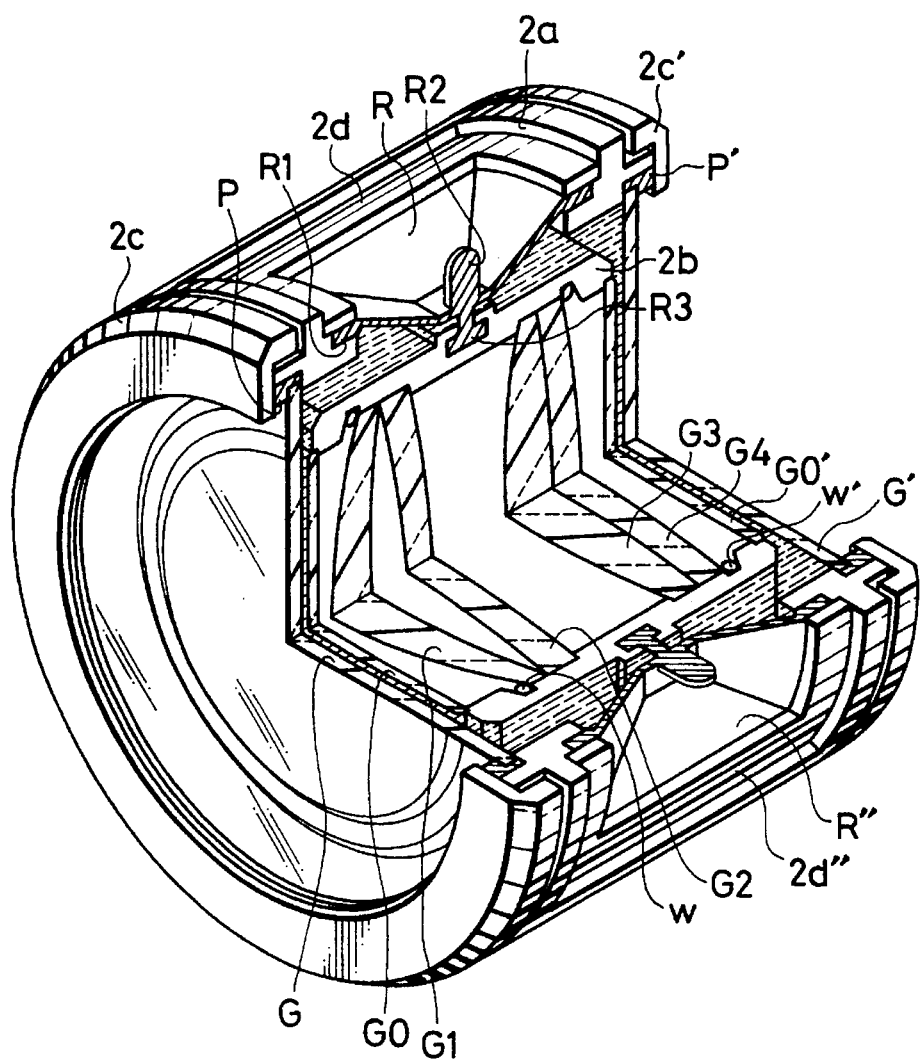
FIG. 3 is a perspective view of a compensating optical unit.

Referring to FIG. 3, the structure of the correction optical unit is explained. FIG. 3 shows an internal structure of the correction optical unit. Numeral 2b denotes a bodytube of a shift lens and contains therein lenses G1–G4 fixed by c-rings W and W', and parallel plane glasses G0 and G0' are air-tightly attached to the opposite ends. Numeral 2a denotes a suspension tube, and parallel plane glasses G and G' are fixed at the opposite ends by rings 2c and 2c' through packing members p and p', and lens drive diaphragms R and R" are pressed to a side by pressing members 2d and 2d". The lens drive diaphragms are made of flexible film material such as rubber and are of a funnel shape having a shaft R2 at the bottom. Another pair of lens drive diaphragms and pressing members are arranged symmetrically with the optical axis so that four sets are arranged in total. The lens drive diaphragms are connected to the plunger 3 at one end of the shaft R2 and coupled to the bodytube 2b at the other end R3 of the shaft. The lens drive diaphragms R and R" also function to keep the correction optical unit in position. They have a high rigidity in the drive direction and a very low rigidity in a direction normal to the drive direction. For example, the drive diaphragm R exhibits little resistance to the drive force to the lens through the drive diaphragm R". Non-colored, transparent and homogeneous liquid such as silicone oil is filled between the air-tight bodytube and the air-tight suspension tube to reduce or eliminate an influence by a gravity force acting on the bodytube and also serve as a lubricant. The lens bodytube is designed such that a specific gravity of the lens is approximately equal to a specific gravity of the liquid. The spacings between the parallel plane glasses G, G0 and G', G0' are selected such that the optical axis of the bodytube does not tilt and there is no optical influence of the liquid. The ends of the parallel-plane glasses G0 and G0' are chamfered at a small angle so that they can easily float from the surfaces of G and G' by the dynamic pressure effect of the liquid when the lens bodytube is driven In the above arrangement, one plane of the parallel plane glass may be one plane of a lens.

When the drive force is applied to the correction optical unit 2 and the latter is momentarily moved toward the suspension tube, dynamic pressures are created between the parallel plane glasses G0, G0' and G, G', respectively, and automatic centering and parallel movement are attained.

FIG. 4 shows a modification of an inclination portion. While only one side is shown in FIG. 4, it is arranged before and after the correction optical unit.

Figure 4A:
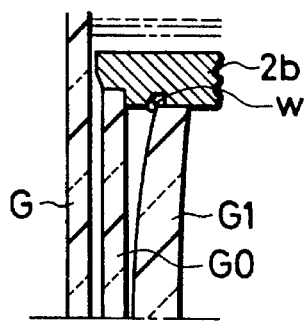
FIGS. 4A and 4B show a modification of FIG. 3.
Figure 4B:
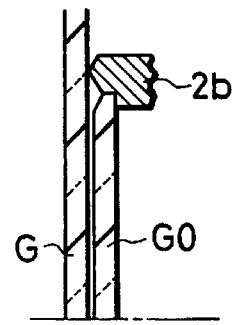

In FIG. 4A, an inclination having the opposite gradient to that of the above embodiment is imparted to an edge of the bodytube 2b having the parallel plane glass G0 attached thereto. FIG. 4B shows a projection of the bodytube 2b and the inclination of the parallel plane glass G0.

A gentle curved surface may be used instead of the inclined surface.

In the present invention, in view of the fact that the image vibration is caused by a complex phenomenon by different accelerations, the vibration is determined for each acceleration component and the correction optical system is driven accordingly. Therefore, the image vibration can be very precisely compensated for and a compact and practical apparatus is provided.

In accordance with the present invention, since the means for driving the optical elements which correct the image vibration does not create a large amount of friction, the liquid suspension function is not damaged and a practical anti-vibration function is attained.

Since the suspension tube and the correction optical unit form the parallel planes, the starting of the movement of the optical correction unit in the vertical and horizontal planes is smooth and rapid.

In accordance with the present invention, the liquid inherent to the liquid suspension method has been noticed so that the correction optical unit is parallelly moved at the correct position by the dynamic pressure generated by the flow of the liquid, with a conventional construction. Thus, the optical anti-vibration is attained with a simple construction.

What is claimed is:

1. An image stabilizing device comprising:

photographic lens means having a first lens unit movable along an optical axis of said photographic lens means and a second lens unit movable in a direction having a component transverse to the optical axis;

first detection means for detecting the position of said first lens unit;

second detection means for detecting a displacement of said photographic lens means;

calculation means for calculating the amount of movement of said second lens unit on the basis of the detection result of said first and second detection means; and driving means for driving said second lens unit on the basis of the result of the calculations of said calculation means.

2. An image stabilizing device according to claim 1, wherein the lateral magnification of said first lens unit varies with movement along the optical axis and wherein said calculation means calculates the amount of movement of said second lens unit taking into consideration said variable lateral magnification.

3. An image stabilizing device according to claim 2, wherein said first lens unit is a lens unit for focusing.

4. An image stabilizing device according to claim 3, wherein said photographic lens means further comprises a front lens unit provided in front of said first lens unit.

5. An image stabilizing device according to claim 1, wherein said second lens unit is provided behind said first lens unit.

6. An image stabilizing device according to claim 5, wherein said second lens unit is provided at the rear end of said photographic lens means.

7. An image stabilizing device comprising:

photographic lens means having a compensation mechanism for stabilizing an image of an object;

focus detecting means for detecting the focusing condition of said photographic lens means in accordance with a photographing light flux of said photographic lens means;

detection means for detecting a displacement of said photographic lens means;

calculation means for calculating the amount said compensation mechanism is to be driven on the basis of the detection result of said detection means;

driving means for driving said compensation mechanism on the basis of the calculation result of said calculation means during the operation of said focus detecting means; and a shutter unit which permits an exposure to be made by said photographic lens means at an imaging plane.

8. An image stabilizing device according to claim 7, wherein said photographic lens means further comprises a movable lens unit movable in a direction having a component transverse to an optical axis of said photographic lens means and wherein said compensation mechanism moves said movable lens unit.

9. An image stabilizing device according to claim 7, further comprising first switching means for outputting a first signal to said focus detecting means and second switching means for outputting a second signal to said shutter unit.

10. An image stabilizing device according to claim 9, wherein said photographic lens means further comprises a movable lens unit movable in a direction having a component transverse to an optical axis of said photographic lens means, and wherein said driving means drives said movable lens unit in response to said first or second signals.

11. An image stabilizing device comprising:

photographic lens means having a compensation mechanism for stabilizing a vibrating image of an object;

focus detecting means for detecting the focusing condition of said photographic lens means in accordance with a photographing light flux of said photographic lens means;

detection means for detecting a displacement of said photographic lens means, the displacement being externally induced by shaking of said photographic lens means and causing image blur;

calculation means for calculating the amount that said compensation mechanism is to be driven on the basis of the detection result of said detection means; and driving means for driving said compensation mechanism on the basis of the calculation result of said calculation means during the operation of said focus detecting means.

12. An image stabilizing apparatus comprising:

objective lens means, including a focusing lens and an optical unit, for focusing an image and for stabilizing an image focused by said focusing lens;

first detection means for detecting a position of said focusing lens;

second detection means for detecting a displacement of said objective lens means induced by external shaking of said objective lens means and causing image blur; and determining means for determining a drive amount of said optical unit for stabilizing the image obtained by said objective lens means based on position information pertaining to said focusing lens and detection information obtained by said second detection means.

13. An image stabilizing apparatus according to claim 12, further comprising decentered means for decentering said optical unit relative to an optical axis of said objective lens, wherein said decentering means is responsive to an output of said determining means.

* * * * *

UNITED STATES PATENT AND TRADEMARK OFFICE
CERTIFICATE OF CORRECTION

PATENT NO. : 5,606,456
DATED : February 25, 1997
INVENTOR(S) : TORU NAGATA, ET AL.

It is certified that error appears in the above-indentified patent and that said Letters Patent is hereby corrected as shown below:

On the title page:

AT [30] Foreign Application Priority Data

"Aug. 28, 1995 [JP] Japan ..... 60-187091" should read
--Aug. 26, 1985 [JP] Japan ..... 60-187091--.

COLUMN 3

Line 35, "of" should read --of the-- and "the" should be deleted.

COLUMN 5

Line 44, "$\dot{y}\, d\, t = 2A \cdot \sin \pi ft$" should read

--$\dot{Y}\, d\, t = 2A \cdot \sin \pi ft$--.

COLUMN 6

Line 20, "driven" should read --driven.--.

Signed and Sealed this

Fourteenth Day of October, 1997

Attest:

BRUCE LEHMAN

Attesting Officer

Commissioner of Patents and Trademarks